Feb. 21, 1950  H. D. IREDALE  2,498,209
PROCESSING MILL

Filed July 16, 1945  2 Sheets-Sheet 1

INVENTOR
HENRY D. IREDALE;
BY
ATTORNEY

Feb. 21, 1950 H. D. IREDALE 2,498,209
PROCESSING MILL

Filed July 16 1945 2 Sheets-Sheet 2

INVENTOR
HENRY D. IREDALE.
BY
ATTORNEY

Patented Feb. 21, 1950

2,498,209

UNITED STATES PATENT OFFICE 2,498,209

PROCESSING MILL

Henry D. Iredale, Geneva, N. Y., assignor to Geneva Processes, Inc., Geneva, N. Y., a corporation of New York Application July 16, 1945, Serial No. 605,380

2 Claims. (Cl. 99—353)

This invention relates to mills and is particularly directed to colloid mills adapted for processing dry materials which are subject to expansion upon the application of moisture and heat; to mills adapted for intimately mixing or blending two or more fluid materials.

An object of this invention is to provide a colloid mill of the character described, comprising a stator and a rotor having closely spaced opposing relatively movable complementary surfaces to form a shear space, and means to feed two or more materials into the space between the rotor and stator, a chamber being provided between the stator and rotor communicating with said shear space to permit expansion of material passing between said surfaces.

Another object of this invention is to provide in a colloid mill of the character described, means for introducing between the complementary surfaces of the rotor and stator of the mill a dry ingredient which expands upon the application of moisture and heat, as for instance starch and means for injecting live steam into said chamber for heating or cooking said ingredient, a chamber being provided between said surfaces whereby to allow for expansion of said substance within said chamber.

Yet another object of this invention is to provide a colloid mill of the character described comprising a conical rotor, and a stator therefor comprising a steam jacket formed with a plurality of ports to introduce live steam to the space between the rotor and stator, the conical surface of the rotor or stator, or both, being recessed to form a chamber to receive the live steam and the materials being processed whereby to permit expansion of particles passing through the mill.

A still further object is to provide in such a mill, means for introducing between the rotor and stator any additional ingredient or substance either in advance of or after the cooking or heating station.

Yet another object of this invention is to provide a strong, compact and rugged device of the character described which shall be relatively inexpensive to manufacture, easy to assemble, smooth and positive in operation and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown various possible illustrative embodiments of this invention:

Figure 3:
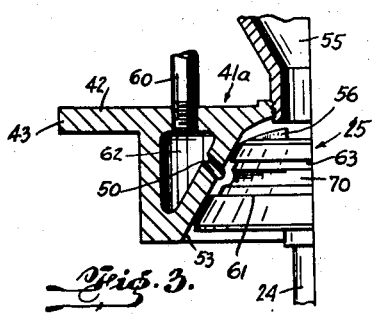
Fig. 3 is a view similar to Fig. 2 but illustrating a modified construction.

Figs. 4 to 17 inclusive are views similar to Fig. 3 and illustrating various modified forms of the invention.

Figure 18:
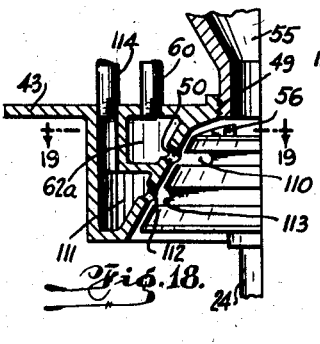

Fig. 18 is a partial, axial, cross-sectional view of still another modification embodying the invention.

Figure 19:
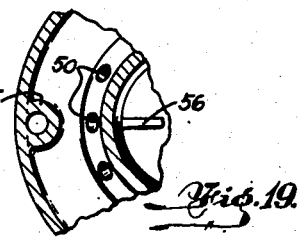

Fig. 19 is a fragmentary sectional view taken on line 19—19 of Fig. 18.

Referring now in detail to the drawing, 10 designates a colloid mill embodying the invention. The same comprises a mill supporting structure 11 provided with a base 12 which rests on the end plate 13 of an electric motor 14. The supporting structure 11 comprises an inclined wall 15 positioned between a pair of side walls 16 converging at the foot of the inclined wall to form a discharge spout 17. The front of the chute or spillway is partially closed by a splash plate 18 which is held in position by knurled nuts 19 which engage studs 20 carried by the side walls 16 of the supporting structure 11. The inclined wall 15 is also provided with jackets 15a, having suitable inlets and outlets, through which steam or cooling liquid may be interposed if desired.

Interconnecting the base 12 with the inclined wall 15 are vertical brace members 21. The shaft 22 of the motor 14 is coupled by coupling 23 to a shaft 24 which drives the frusto-conical rotor member 25. On shaft 24 is an enlarged portion 26 journalled in a bearing 27 extending upwardly from and integrally formed with the inclined wall 15 and extending into the chute 16. At the upper end of the supporting structure 11 is an annular opening 30. Integrally formed with the upper end of the supporting structure 11 are a plurality of external, upwardly extending brackets 31, each provided with a radially inwardly extending set screw 32 for the purpose hereinafter appearing.

Mounted on the upper end of structure 11 is a collar 33 having a base flange 34 at its lower end formed with a frusto-conical outer surface 35 engaged by the inner ends of the set screws 32 which serve to removably secure collar 33 to the structure 11 and for centering the stator 41a relative to the rotor 25. Collar 33 further comprises a cylindrical wall 36 formed with external screw threads 37. Fixed to the upper edge of wall 36 and extending upwardly therefrom are a plurality of studs 38. Screwed to the threaded portion 37 is an annular ring 40 provided with radial handles 41.

Telescoped within the collar 33 is a jacketed stator 41a. The stator 41a comprises a top wall 42 provided with an outwardly extending flange 43 contacting the upper edge of the ring 40. Flange 43 is formed with through openings through which the studs 38 pass, these openings being somewhat oversized to permit some freedom of relative movement between the flange 43 and the collar 33. Wing nuts 44 on the upper ends of the studs 38 serve to press the flange 43 against the ring. Extending downwardly from the top wall 42 is a cylindrical wall 46 slidably received within the inner surface of the cylindrical wall 36 of collar 33. Extending from the lower end of wall 46 is a frusto-conical wall 47 which joins the top wall 42 to form an annular shear space 48. The top wall 42 is formed with a central screw-threaded opening 49 for the purpose hereinafter appearing. Wall 47 is formed with an annular row of spaced openings 50. Within the stator 41a is a frusto-conical chamber 52 in which the rotor 25 projects. Wall 47 is closely adjacent to and in opposed relation to the frusto-conical surface 54 of the rotor.

The clearance between the rotor 25 and the stator is controlled by raising and lowering the entire stator 41a by means of the handles 41 to screw the annular member 40 up or down, as desired. When the proper adjustment has been made, wing nuts 44 on the bolts 38 may be tightened to hold the adjustment fixed.

Screwed to the threaded opening 49 is an inlet or hopper 55 whereby material may be introduced into the upper end of the mill. The rotor may be provided on its outer end with removable vanes 56. The material passing into the upper end of the device will be thrown outwardly by the rotor and moved downwardly between the surfaces 53 and 54. Live steam may be introduced to inlet pipes 60 attached to the top wall 42 of the stator 41a and communicating with shear space 48. The steam may pass through the openings 50 into contact with the substance passing between the surfaces 53, 54 for heating or cooking the same.

Figure 1:
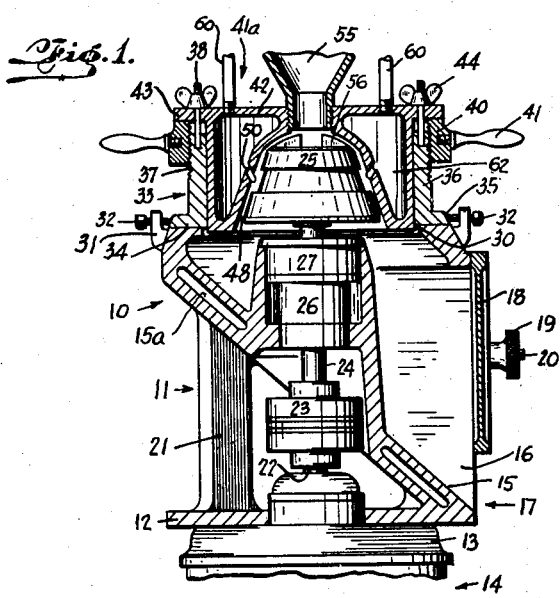
Fig. 1 is a partial, axial, cross-sectional view of a colloid mill embodying the invention.
Figure 2:
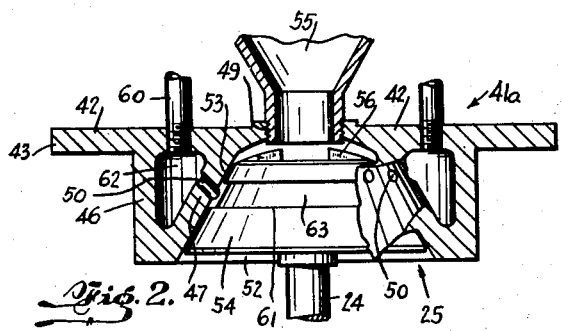
Fig. 2 is a partial, axial, cross-sectional view of the structure shown in Fig. 1.

In accordance with the present invention, means is provided to permit expansion of particles being cooked as the material passes through the mill. In Figs. 1 and 2 there is shown one embodiment of the invention. As shown in said figures, the surface 54 is formed with an external groove 61 forming an annular chamber 63 between the rotor and stator. At the bottom of chamber 63 is a frusto-conical surface as illustrated in Figs. 1 and 2 of the drawing. Openings 50 open into chamber 63.

One example of the use of the mill described herein is the cooking of a starch and water slurry. The expansion chamber 63 is provided on the rotor to allow the individual starch grains to swell and burst when they come in contact with live steam. The chamber is spaced from the top and bottom peripheries of the rotor. Any suitable number of openings 50 may be provided. These openings are also spaced from the top of the steam jacket and open opposite the chamber 63. These openings are preferably perpendicular to the surface 53 though it may be desirable, and at times advantageous, to have such openings directed angularly with respect of the surface 53. The starch and water slurry may be pumped through the material inlet 55 under pressure, and at the same time live steam is fed into the jacket of the stator through the pipe 60. By varying the rate of feed of the starch-water slurry and the steam pressure within the jacket, the temperature of the starch-water slurry at the exit may be controlled.

It is also possible to cook the starch by heat only, in which case the steam ports 50 may be omitted, and steam or other heating medium may be used to heat the stator and rotor surfaces defining the shear space 48.

The expansion chamber may have various shapes. Also the position and size of the chamber may be varied as well as the number of these chambers. Furthermore, the expansion chamber or chambers can be cut into the working face of the stator as well as the rotor or in both. Thus in Fig. 3 the rotor is provided with an annular groove 61, but the frusto-conical wall surface 63 of said groove may be formed with an annular intermediate curved groove 70.

Figure 4:
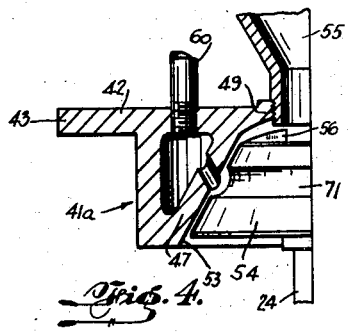

In Fig. 4 the outer surface 54 of the rotor is formed with an annular groove 71 of curved cross-section.

Figure 5:
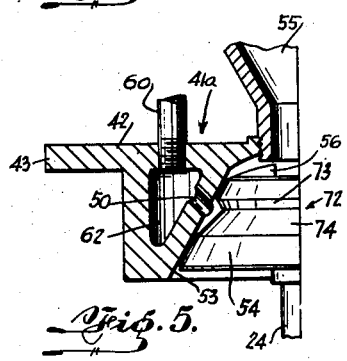

In Fig. 5 the outer surface 54 of the rotor is formed with a groove 72 having an upper, downwardly and inwardly inclined surface 73, and a lower downwardly and outwardly inclined surface 74.

Figure 6:
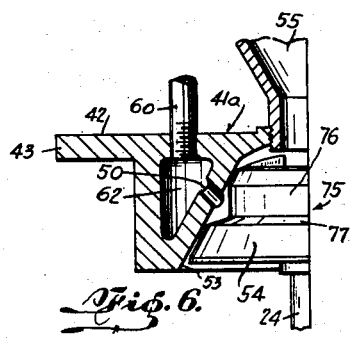

In Fig. 6 the outer surface 54 of the rotor is formed with an annular intermediate groove 75 comprising a cylindrical upper surface 76, and a lower downwardly and outwardly inclined surface 77.

Figure 7:
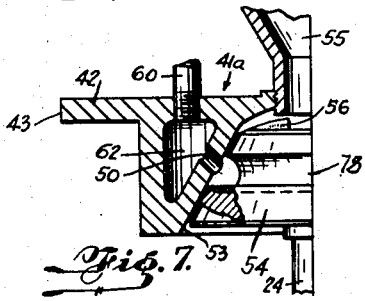

In Fig. 7 the outer surface 54 of the rotor is formed with an annular groove 78 which is semicircular in transverse cross-section and which has the center of the semi-circle on the line joining the conical surfaces 54.

Figure 8:
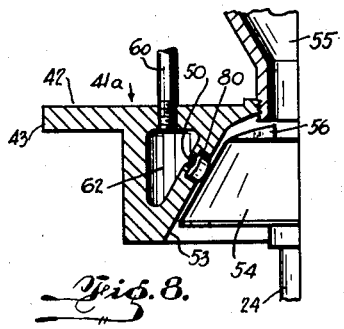

In Fig. 8 the outer surface 54 of the rotor is not grooved at all. Instead the expansion chambers are formed on the inner surface 53 of the stator. As shown in Fig. 8 the inner surface 53 of the stator is formed with countersunk openings 80 communicating with the through openings 50.

Figure 9:
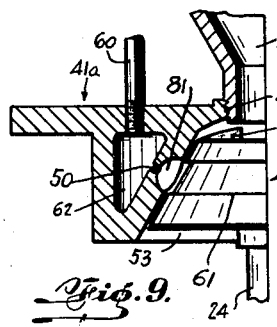

In Fig. 9 the expansion chamber is both cut into the rotor as well as the stator. Thus the rotor 25 is formed with an annular groove 61 as in Figs. 1 and 2, and the surface 53 of the stator is formed with recesses 81 communicating with the through openings 50. The chamber thus comprises the space formed by the groove 61 as well as by the recesses 81 which communicate with the groove.

Figure 10:
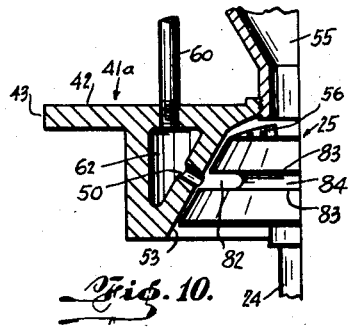

In Fig. 10 the rotor is formed with an annular horizontal groove 82 having parallel upper and lower surfaces 83 and an inner curved surface 84.

Figure 11:
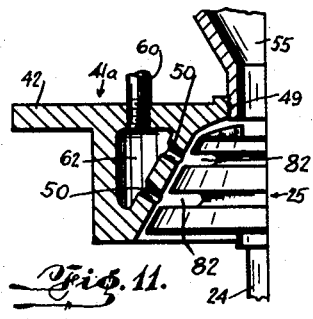

In Fig. 11 the rotor has two spaced annular grooves 82 instead of one and the stator has two sets of openings 50 instead of one. The sets of openings 50 communicate with the two grooves 82 respectively.

Figure 12:
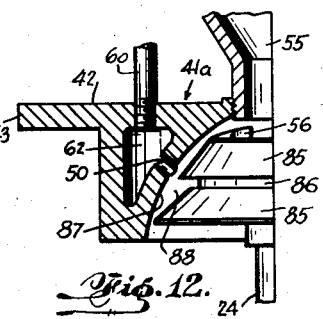

In Fig. 12 the rotor is formed of two differently angled frusto-conical surfaces 85 separated by an annular groove 86. Furthermore, the stator is formed with an inner curved wall 87 forming a chamber 88 with the rotor for expansion of material.

Figure 13:
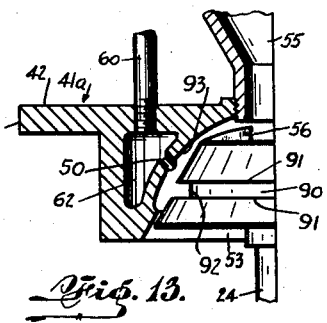

In Fig. 13 the rotor is formed with an annular groove 90 having horizontal parallel top and bottom surfaces 91 and the bottom of the groove comprising a cylindrical surface 92. The stator may be formed likewise with an inner curved surface 93 to form a chamber with the rotor. The openings 50 in the inner wall of the stator may thus be spaced above the groove 90 instead of being in alignment therewith.

Figure 14:
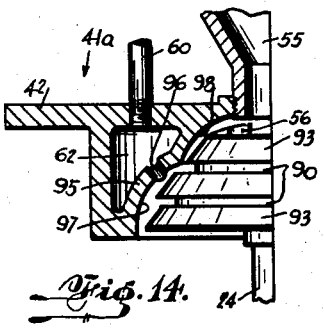

In Fig. 14 the rotor is formed with a pair of grooves 90 and with frusto-conical surfaces 93 between and on opposite sides of said grooves. The stator is formed with an inner wall 95 formed with openings 96. The wall 95 may have a pair of inner curved surfaces 97, 98 as shown in Fig. 14.

Figure 15:
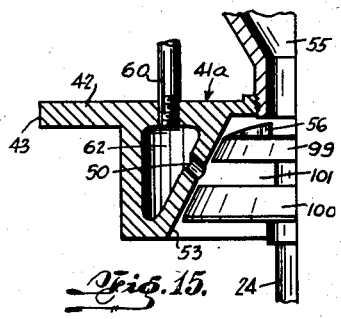

In Fig. 15, the rotor is formed with a pair of spaced separate frusto-conical portions 99 and 100, forming a space 101 therebetween.

Figure 16:
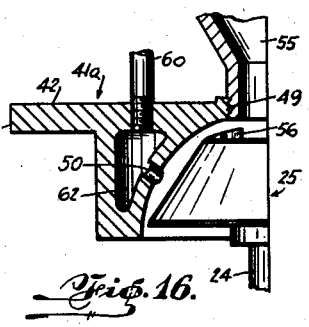

In Fig. 16 the rotor has no groove therein and the stator is curved concavely similar to the one shown in Fig. 12.

Figure 17:
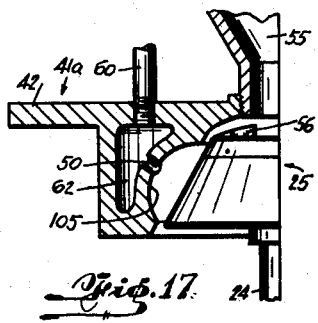

In Fig. 17 the stator is formed with its inner wall having a curved surface 105, the outer end of which is above the lower surface of the rotor and the upper end of which is below the upper end of the rotor.

It may be desirable to enter an additional or a different substance to the material passing through the mill as, for instance, an enzyme, and to that end, there is provided, as illustrated in Figs. 18 and 19, a stator having a chamber 62a as for steam, and having the openings 50 leading therefrom and directed to an expansion chamber 110. An additional chamber 111 is here provided in the stator from which, ports 112 open into the chamber 113. The chamber 111 is fed as by pipe 114 threaded into the boss 115 in the stator. In the example described, the enzyme was described as being entered to the shear space after the cooking operation. However, it will be understood that this procedure may be reversed within the scope of the invention. If found desirable to do so, the enzyme might be fed to the oncoming starch prior to the cooking operation. While starch and water slurry has been mentioned, it will be understood that this is referred to merely by example. Gums, sizes and other substances which expand upon heating in the presence of moisture may be processed in the same manner. Vegetables may also be processed and cooked in this manner. The mill as described might be used as a starch converter in the production of dextrose.

It will be understood that the inlets for the steam can be positioned anywhere on the stator or even in a hollow rotor, so long as these inlets feed into the space between the rotor and stator or into a chamber formed between the rotor and stator. By feeding a substance into the mill to pass between the rotor and stator, and injecting live steam by means of another port or series of ports, a very efficient method of heating or cooking is produced. The shape as well as the position and size of the expansion chamber may be varied as well as the number of such chambers.

Furthermore, the expansion chamber or chambers can be cut into the working face of the stator or the rotor or in both.

It will further be understood that the improved apparatus embodying the invention is not confined to cooking alone but may also apply to chemical reactions where it is desirable to feed separately the various reagents, and catalysts, if required, and leaving them blended simultaneously and instantly. The apparatus may also be applied to oxidation and reduction reactions involving the treating of liquid, or solids in liquids with gaseous reagents.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, what I claim as new and desire to secure by Letters Patent is:

1. In combination, a rotor, and a stator, said rotor and stator having closely spaced opposed surfaces, one of said surfaces being recessed intermediate but remote from both ends of the rotor to form an expansion chamber, means to feed substance between said surfaces, and means to feed live steam to said chamber.

2. In a mill, a stator comprising an annular jacket, means to feed steam to said jacket, said jacket having a conical wall formed with one or more openings, a rotor rotatably mounted within said stator and having a conical wall closely spaced from and substantially parallel to said first conical wall and formed with an annular groove aligned with said one or more openings, and forming an expansion chamber, means to feed material to the space between said rotor and stator, and means to feed a gaseous substance to said jacket, said groove being disposed between and occupying approximately one-third the height between the upper and lower ends of said conical wall.

HENRY D. IREDALE.

REFERENCES CITED

The following references are of record in the file of this patent:

UNITED STATES PATENTS

| Number | Name | Date |
|---|---|---|
| 983,055 | Hosmann | Jan. 31, 1911 |
| 2,075,403 | Nester | Mar. 30, 1937 |
| 2,083,171 | Nester | June 8, 1937 |
| 2,125,455 | McLean | Aug. 2, 1938 |
| 2,221,342 | Butler | Nov. 12, 1940 |
| 2,342,252 | Claybourn | Feb. 22, 1944 |
| 2,402,170 | Lund | June 18, 1946 |